(12) United States Patent
Holman, IV et al.

(10) Patent No.: US 8,498,102 B2
(45) Date of Patent: Jul. 30, 2013

(54) ROTATABLE COUPLING MECHANISM

(75) Inventors: Martin Earl Holman, IV, West Palm Beach, FL (US); Bruce Alan Ivanik, Boca Raton, FL (US); Douglas Wayne Moskowitz, Weston, FL (US)

(73) Assignee: Research In Motion Limited, Waterloo, Ontario (CA)

( * ) Notice: Subject to any disclaimer, the term of this patent is extended or adjusted under 35 U.S.C. 154(b) by 325 days.

(21) Appl. No.: 13/040,384

(22) Filed: Mar. 4, 2011

(65) Prior Publication Data

US 2012/0224300 A1    Sep. 6, 2012

(51) Int. Cl.
G06F 1/16       (2006.01)

(52) U.S. Cl.
USPC ............... 361/679.27; 361/679.01; 16/273; 16/277; 16/286

(58) Field of Classification Search
USPC .................................... 361/679.27; 16/286
See application file for complete search history.

(56) References Cited

U.S. PATENT DOCUMENTS

| | | | |
|---|---|---|---|
| 6,766,182 B2 | 7/2004 | Janninck et al. | |
| 6,883,206 B2 * | 4/2005 | Yang et al. | 16/337 |
| 7,047,598 B2 * | 5/2006 | Huang | 16/312 |
| 7,050,767 B2 | 5/2006 | Hickey et al. | |
| 7,117,564 B2 * | 10/2006 | Jeong | 16/334 |
| 7,159,833 B2 | 1/2007 | Kato | |
| 7,162,030 B2 | 1/2007 | Bell et al. | |
| 7,168,135 B2 | 1/2007 | Jung et al. | |
| 7,184,805 B2 | 2/2007 | Cho et al. | |
| 7,346,375 B2 | 3/2008 | Sato et al. | |
| 7,376,450 B2 | 5/2008 | Chen | |
| 7,419,099 B2 | 9/2008 | Lee et al. | |
| 7,440,782 B2 | 10/2008 | Cha | |
| 7,469,449 B2 | 12/2008 | Hsu | |
| 7,492,893 B2 | 2/2009 | Ahn et al. | |
| 7,496,194 B2 | 2/2009 | Jeun | |
| 7,496,389 B2 | 2/2009 | Cho et al. | |
| 7,529,571 B2 | 5/2009 | Byun et al. | |
| 7,565,185 B2 | 7/2009 | Kang et al. | |
| 7,577,466 B2 | 8/2009 | Kim | |
| 7,580,734 B2 | 8/2009 | Ahn et al. | |
| 7,610,067 B2 | 10/2009 | Cho et al. | |
| 7,613,485 B2 * | 11/2009 | Chen et al. | 455/575.4 |
| 7,624,477 B2 * | 12/2009 | Chien et al. | 16/286 |
| 7,725,987 B2 | 6/2010 | Duan et al. | |
| 7,778,673 B2 | 8/2010 | Zhu | |
| 7,787,245 B2 * | 8/2010 | Prabhune et al. | 361/679.37 |

(Continued)

FOREIGN PATENT DOCUMENTS

| | | |
|---|---|---|
| CA | 2688591 | 8/2010 |
| DE | 102009021873 | 11/2010 |

(Continued)

OTHER PUBLICATIONS

European Search Report dated Aug. 26, 2011 for European Application No. 11 15 7075.

*Primary Examiner* — Anthony Q Edwards
(74) *Attorney, Agent, or Firm* — Jon A. Gibbons; Fleit Gibbons Gutman Bongini & Bianco PL (57) ABSTRACT

A rotatable coupling mechanism includes an annular base member and a first annular member. A second annular member is mechanically coupled to the annular base member. A resilient member is disposed between the first annular member and the second annular member.

20 Claims, 9 Drawing Sheets

U.S. PATENT DOCUMENTS

| | | |
|---|---|---|
| 7,797,795 B2 | 9/2010 | Maatta et al. |
| 8,082,632 B2 * | 12/2011 | Bae .................................. 16/374 |
| 2004/0203527 A1 | 10/2004 | Matsumoto |
| 2005/0091796 A1 * | 5/2005 | Lu et al. ........................... 16/337 |
| 2005/0111113 A1 * | 5/2005 | Shirie ............................. 359/701 |
| 2005/0137000 A1 | 6/2005 | Toh et al. |
| 2006/0210060 A1 | 9/2006 | Ishikawa et al. |
| 2009/0007378 A1 * | 1/2009 | Guo et al. ........................ 16/286 |
| 2010/0216512 A1 | 8/2010 | Aghaei et al. |

FOREIGN PATENT DOCUMENTS

| | | |
|---|---|---|
| EP | 1507388 | 2/2005 |
| EP | 2222058 | 8/2010 |
| GB | 850099 | 9/1960 |
| GB | 2271152 | 4/1994 |

* cited by examiner

ROTATABLE COUPLING MECHANISM

FIELD OF THE DISCLOSURE

The present disclosure generally relates to mechanical rotatable coupling mechanisms for portable electronic devices, and more particularly to a swivel mechanism that is rotatable.

BACKGROUND

Conventional rotating mechanisms for coupling portions of a portable electronic device such as a display and a keyboard typically have flat bearing surfaces that rest against each other. These flat bearing surfaces generate friction that causes unnecessary wear on the components of the mechanism. Therefore, conventional rotating mechanisms can experience premature failure.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, and other similar devices.

Various materials or combinations of materials can be used to construct the rotatable coupling mechanism and its components. For example, materials such as plastics (e.g., polyoxymethylene), metals, metal alloys, composites, ceramics, and other inorganic or organic materials or combinations thereof may be used.

Described below is a rotatable coupling mechanism that comprises an annular base member that is substantially circular. The annular base member comprises an annular inner portion and an annular outer portion circumscribing the annular inner portion. The annular outer portion comprises a first undulating surface that comprises a set of alternating peak regions and valley regions. A first annular member is movable in an axial direction with respect to the annular base member. The first annular member comprises a set of rollers disposed thereon and movable along the first undulating surface. A second annular member is mechanically coupled to the annular base member. The first annular member is disposed between the annular inner portion of the annular base member and a flanged region of the second annular member. The first annular member is rotatable around the annular base member and the second annular member. A resilient member is disposed between an inner wall of the first annular member and an outer wall of the second annular member. The resilient member comprises a second undulating surface. A set of peak regions of the second undulating surface exert a first axial force against a bottom surface of the flanged region of the second annular member. The bottom surface faces the annular base member. A set of valley regions of the second undulating surface exert a second axial force, which is opposite to the first axial force, on an inner beveled edge formed along the inner wall of the first annular member, thereby urging the rollers towards the valley regions of the annular base member.

The rotatable coupling mechanism is advantageous over conventional mechanisms because it eliminates unnecessary wear by reducing friction. For example, rotatable coupling mechanism utilizes rollers (or wheels), which eliminate the need for bearings that create friction. Another advantage of the rotatable coupling mechanism is that it can move along the z-axis. This reduces the friction experienced between the coupled components of the device by lifting the components off of each other as they are rotated. A further advantage of the rotatable coupling mechanism is that it assists the user when rotating the coupled components.

Rotatable Coupling Mechanism

Figure 1:
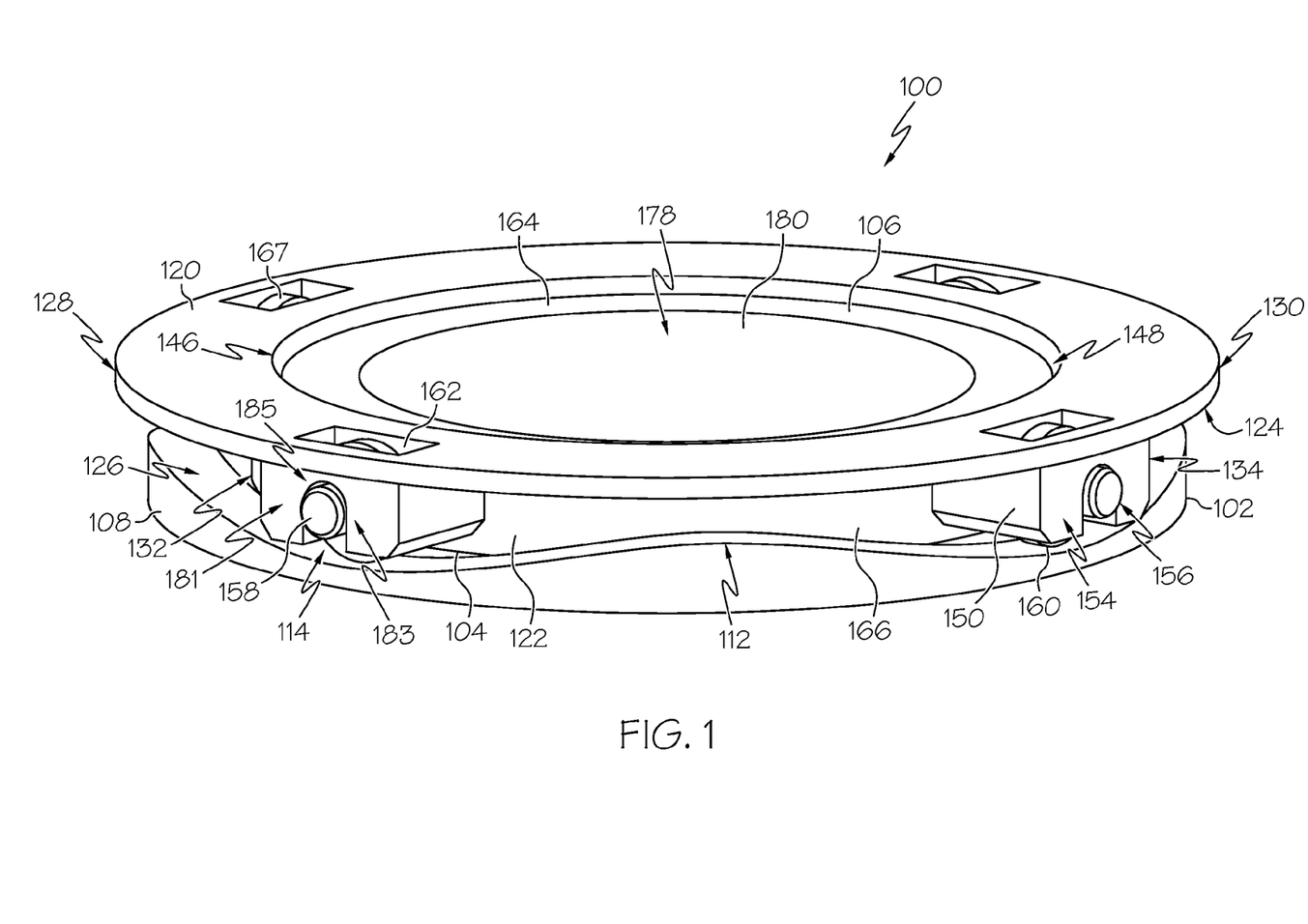
FIG. 1 is a top-front perspective view of a rotatable coupling mechanism according to one example.
Figure 2:
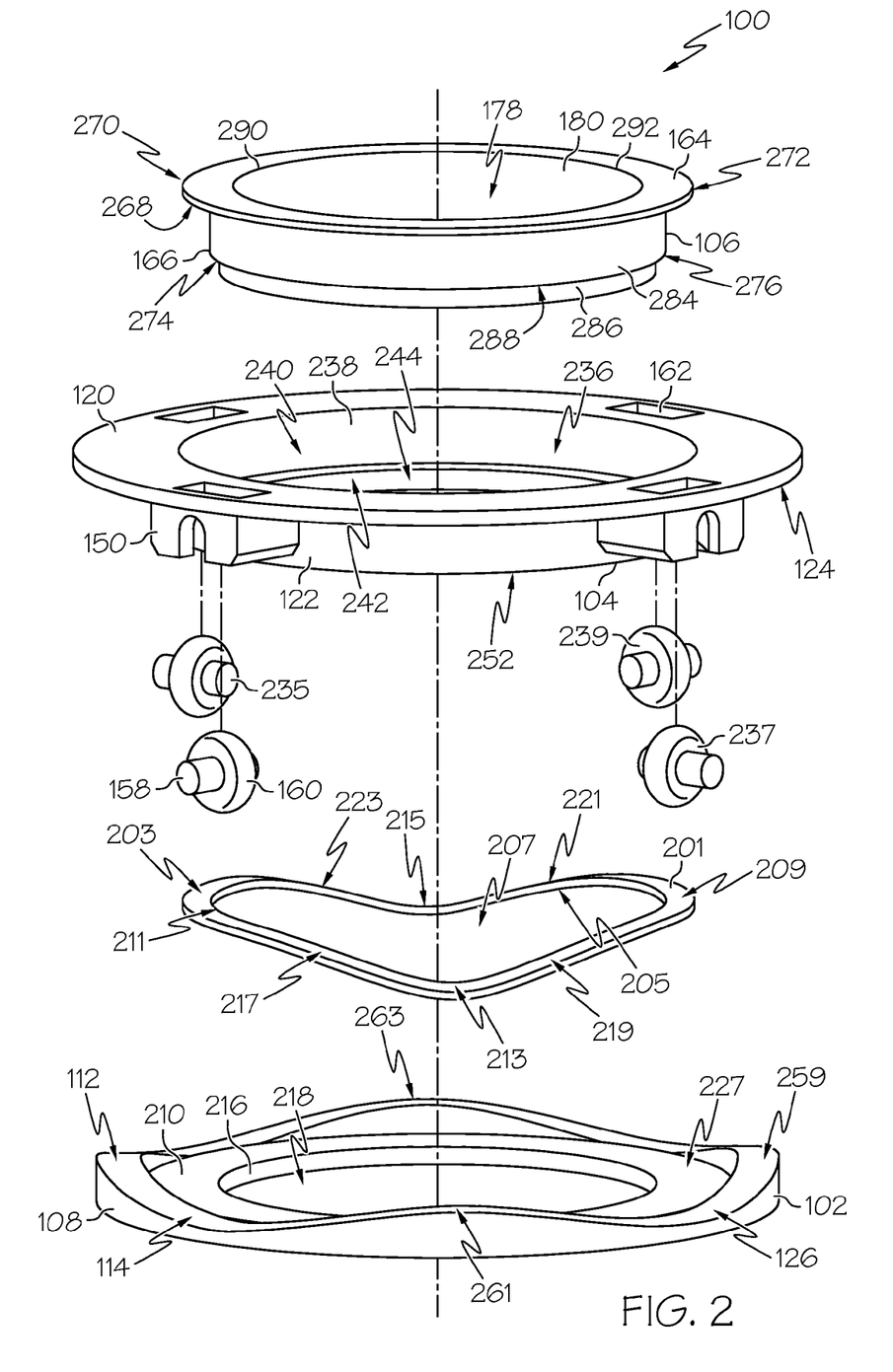
FIG. 2 is an exploded side view of the rotatable coupling mechanism of FIG. 1 according to one example.
Figure 9A:
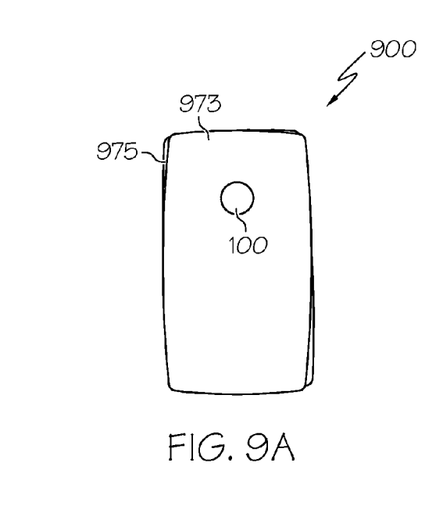
FIGS. 9A-9F is a transitional diagram illustrating various positions of the rotatable coupling mechanism of FIG. 1 and a portable electronic device implementing the rotatable coupling mechanism.
Figure 9B:
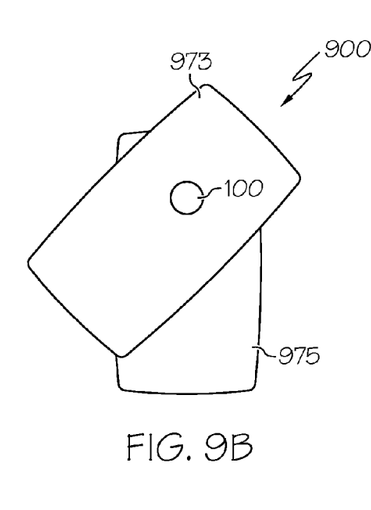
Figure 9C:
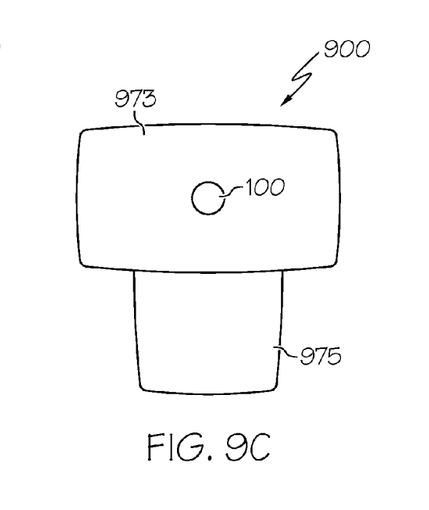

FIG. 1 is a front perspective view of a rotatable coupling mechanism 100 and FIG. 2 is an exploded side view of the rotatable coupling mechanism 100 according to one example. The rotatable coupling mechanism 100 allows for a first portion, such as a display, of a portable electronic device, such as a wireless communication device, to be rotated about a second portion of the device such as a keyboard, as shown in FIGS. 9A, 9B, and 9C. In one example, the rotatable coupling mechanism 100 comprises an annular base member (or cam) 102, a first annular member (or wheel ring) 104, and a second annular member (or center ring) 106.

The annular base member (or cam) 102 is substantially circular and comprises an annular outer portion (or flanged portion/region) 108 and an annular inner portion 210, which are both substantially circular. In one embodiment, the annular outer portion 108 comprises a width w that is greater than a width of a roller (or wheel) 160. However, other width dimensions are also applicable. The annular outer portion 108 circumscribes the annular inner portion 210 and comprises a set of peak regions 112 and valley regions 114, where a peak region 112 transitions into a valley region 114 and vice versa. The peak regions 112 and valley regions 114 form an undulating pattern/surface around the annular outer portion 108. Each peak region 112 is positioned substantially 90 degrees from its immediate neighboring peak region and each valley region 114 is positioned substantially 90 degrees from its immediate neighboring valley region 114. Therefore, in this example, there are a total of four peaks 112 and four valleys 114. However, other configurations of the peaks 112 and valleys 114 are also applicable as well.

A peak region 112 comprises a height h_peak that is greater than a height h_valley of a valley region 114 and a height h_inner of the annular inner portion 210. The height h_valley of a valley region 114 is less than the height h_inner of the annular inner portion 210. However, in other embodiments the height h_valley of a valley region 114 can be equal to or greater than the height h_inner of the annular inner portion 210. The annular inner portion 210 of the annular base member (or cam) 102 is substantially flat/planar. An inner wall 216 of the annular inner portion 210 circumscribes a cavity 218 circumscribes of the annular base member (or cam) 102. The cavity 218 defines a diameter d_cavity that is dimensioned to receive the second annular member (or center ring) 106.

The first annular member (or wheel ring) 104 comprises an upper portion 120 and a lower portion 122, which are both substantially circular. The upper portion 120 is substantially parallel to the annular inner portion 210 of the annular base member (or cam) 102. The lower portion 122 extends outwards from a bottom surface 124 of the upper portion 120. The bottom surface 124 of the upper portion 120 faces a top surface 126 of the annular outer portion 108 of the annular base member (or cam) 102. The upper portion 120 extends beyond the lower portion 122 of the first annular member (or wheel ring) 104. For example, the upper portion 120 comprises an outer diameter d1 between outer regions 128, 130 of the upper portion 120 that is greater than an outer diameter d2 between outer regions 132, 134 of the lower portion 122.

The first annular member (or wheel ring) 104 also defines a cavity 236 that extends through the upper portion 120 and the lower portion 122. An inner wall 238 of the lower portion 122 circumscribes the cavity 236. The inner wall 238 comprises a first portion 240 and a second portion 242 that are coupled to each other via a chamfered region (or beveled edged) 244 that traverses the inner wall 238. The first portion 240 comprises a diameter d3 that is substantially equal to an inner diameter d4 between inner regions 146, 148 of the upper portion 120 and that is greater than a diameter d5 of the second portion 242.

A plurality of retaining members (or wheel holder) 150 extend from the bottom surface 124 of the upper portion 120 toward a bottom area/surface 252 of the lower portion 122 and a top surface 126 of the annular outer portion 108 of the first annular member (or wheel ring) 104. A front portion 154 of each retaining member (or wheel holder) 150, which is situated toward the outer regions 128, 130 of the upper portion 120, defines one or more slots 156 for receiving an extending member 158 of a roller (or wheel) 160. The slot 156 comprises a first side 181, a second side 183, and a top portion 185 that substantially surround the extending member 158. The extending member 158, in one embodiment, extends outwards from a center of the roller (or wheel) 160. The upper portion 120 of the first annular member (or wheel ring) 104 defines a set of cavities 162 situated above each of the retaining members (or wheel holder) 150. These cavities 162 expose a portion 167 of the roller (or wheel) 160 so that the roller (or wheel) 160 can move freely within the retaining member (or wheel holder) 150 without obstruction.

The second annular member (or center ring) 106 comprises an upper (or flanged) portion 164 and a lower portion 166, which are both substantially circular. The upper portion 164 is substantially parallel to the annular inner portion 210 of the annular base member (or cam) 102 and the upper portion 120 of the first annular member (or wheel ring) 104. The lower portion 166 extends outwards from a bottom surface 268 of the upper portion 164. The bottom surface 268 of the upper portion 164 faces the top surface 126 of the annular base member (or cam) 102. The upper portion 164 extends beyond the lower portion 166 of the second annular member (or center ring) 106. For example, the upper portion 164 comprises an outer diameter $d_6$ between outer regions 270, 272 of the upper portion 164 that is greater than an outer diameter $d_7$ between outer regions 274, 276 of the lower portion 166.

The second annular member (or center ring) 106 also defines a cavity 178 that extends through the upper portion 164 and the lower portion 166. An inner wall 180 of the lower portion 166 circumscribes the cavity 178. The lower portion 166 comprises a first outer wall portion 284 and a second outer wall portion 286 that are coupled to each other via an outer wall chamfered region (or beveled edge) 288 that traverses an outer wall of the lower portion 166. The first outer wall portion 284 comprises a diameter $d_8$ that is substantially equal to an inner diameter $d_9$ between inner regions 290, 292 of the upper portion 166 and that is greater than a diameter $d_{10}$ of the second outer wall portion 286.

The rotatable coupling mechanism 100 also comprises a resilient member (or spring) 201 such as, but not limited to a spring or washer. The resilient member (or spring) 201 comprises an outer portion/wall 203 and an inner portion/wall 205 that circumscribes a cavity 207. The resilient member (or spring) 201 comprises a set of peak regions 209, 211 and a set of valley regions 213, 215 that form an undulating pattern/surface around the resilient member (or spring) 201. A first peak region (or elevated region) 209 is situated substantially opposite (approximately 180 degrees) from a second peak region (or elevated region) 211. A first valley region 213 (or lower region) is situated substantially opposite (approximately 180 degrees) from a second valley region (or lower region) 215. Portions 217, 219, 221, 223 of the resilient member (or spring) 201 that transition a peak region 209, 211 to a valley region 213, 215 (and vice versa) slope downwards from a peak region 209, 211 towards a valley region 213, 215 such that the slope decreases from a peak region 209, 211 to a valley region 213, 215.

Figure 3:
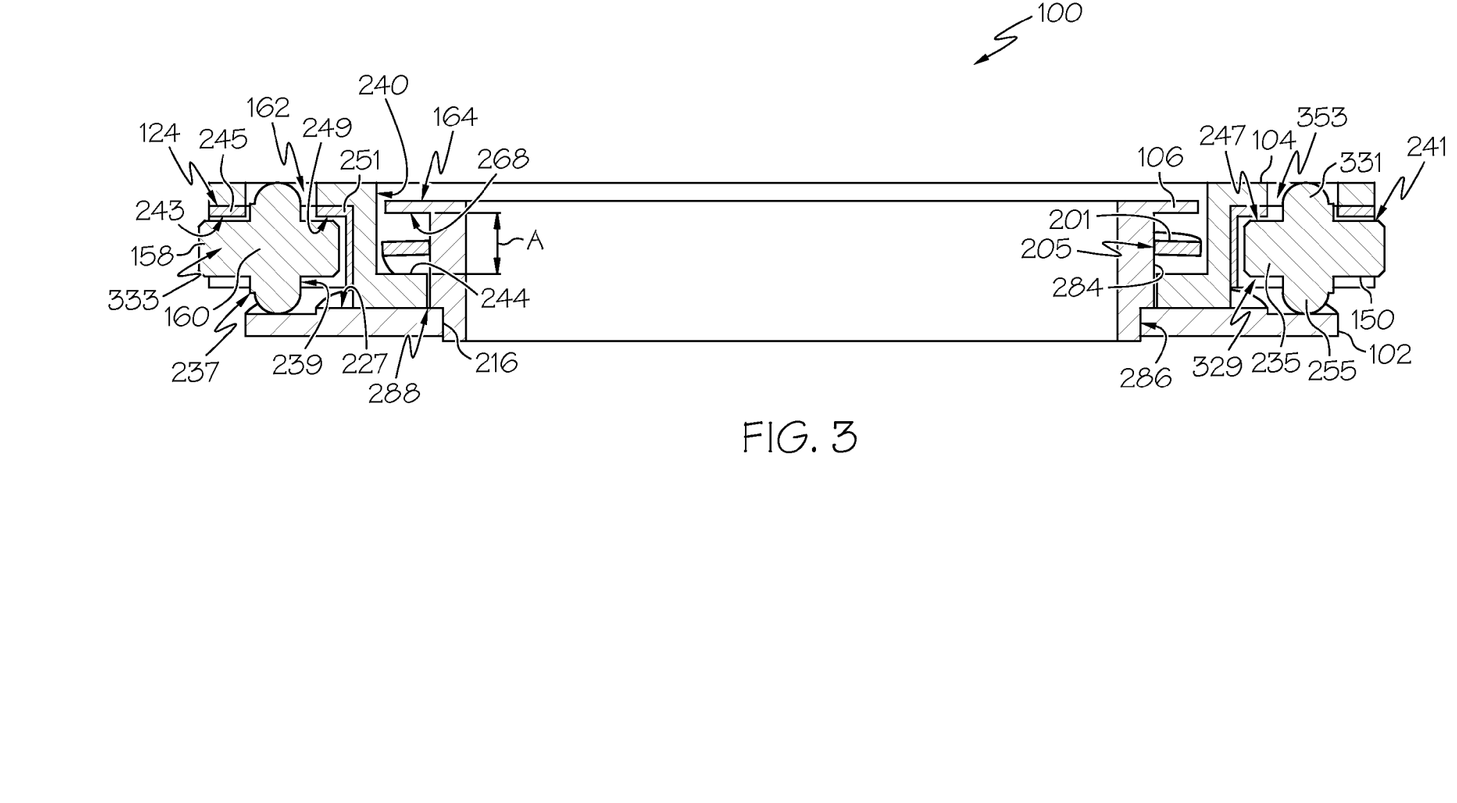
FIG. 3 is a cross-sectional view of the rotatable coupling mechanism of FIG. 1 according to one example.

FIG. 3 shows a cross-sectional view of the rotatable coupling mechanism 100. As can be seen in FIG. 3, the second annular member (or center ring) 106 is dimensioned to reside within the first annular member (or wheel ring) 104. When the second annular member (or center ring) 106 resides within the first annular member (or wheel ring) 104, as shown in FIG. 3, the chamfered region 244 of the first annular member (or wheel ring) 104 is situated below the upper portion 164 of the second annular member (or center ring) 106. The chamfered region 244 extends substantially close to the first outer wall portion 284 of the lower portion 166 of the second annular member (or center ring) 106. The upper portion 164 of the second annular member (or center ring) 106 extends towards the first portion 240 of the inner wall 238 of the first annular member (or wheel ring) 104. This results in at least a portion of the upper portion 164 and a portion of the chamfered region 244 being above/below each other. As can be seen in FIG. 3 there exists an area A between the bottom surface 268 of the upper portion 164 of the second annular member (or center ring) 106 and the chamfer region 244. This area A defines the distance in which the first annular member (or wheel ring) 104 can move on the z-axis, which will be described in further detail below. It should be noted that because at least a portion of the upper portion 164 of the second annular member (or center ring) 104 and the chamfered region 244 overlap each other, the first annular member (or wheel ring) 104 is retained between the upper portion 164 of the second annular member (or center ring) 106 and the annular base member (or cam) 102.

FIG. 3 also shows that the chamfered region 288 of the second annular member (or center ring) 106 abuts the top surface 227 of the annular inner portion 210 of the annular base member (or cam) 102. The second outer wall portion 286 of the outer wall 282 of the second annular member (or center ring) 106 abuts the inner wall 216 of the annular inner portion 210. In one embodiment, the second annular member (or center ring) 106 is mechanically coupled to the annular base member (or cam) 102 where the chamfered region 288 abuts the top surface 227 of the annular inner portion 210 of the annular base member (or cam) 102 and/or where the second outer wall portion 286 of the outer wall 282 of the second annular member (or center ring) 106 abuts the inner wall 216 of the annular inner portion 210. Therefore, the second annular member (or center ring) 106 is fixed to the annular base member (or cam) 102 while the first annular member (or wheel ring) 104 is able to move in a vertical/axial direction and freely rotate around the second annular member (or center ring) 106.

FIG. 3 also shows the retaining members (or wheel holder) 150 in more detail. In particular, FIG. 3 shows that a retaining member (or wheel holder) 150 comprises a hollow area 329 for housing a portion 331 of the roller (or wheel) 160, a portion 333 of a first extending member 158, and a second extending member 235. As can be seen, the first extending member 158 extends outward in a horizontal direction from a sidewall 237 of the roller (or wheel) 160 that faces the outer region 128, 130 of the upper portion 120 of the first annular member (or wheel ring) 104. The second extending member 235 extends outward in a horizontal direction from a sidewall 239 of the roller (or wheel) 160 that faces the lower portion 122 of the first annular member (or wheel ring) 104. A top portion 241 of the first extending member 158 abuts a bottom surface 243 of a first top portion 245 of the retaining member (or wheel holder) 150. The first top portion 245 abuts the bottom surface 124 of the upper portion 120 of the first annular member (or wheel ring) 104. A top portion 247 of the second extending member 235 abuts a bottom surface 249 of a second top portion 251 of the retaining member (or wheel holder) 150. The second top portion 251 abuts the bottom surface 124 of the upper portion 120 of the first annular member (or wheel ring) 104.

A slotted area 353 is situated between the first top portion 245 and the second top portion 251 that allows a portion 331 of the roller (or wheel) 160 to extend above the retaining member (or wheel holder) 150 and into the cavity 162 situated in the upper portion 120 of the first annular member (or wheel ring) 104. As stated above, this configuration allows the roller (or wheel) 160 to move/rotate freely within the retaining member (or wheel holder) 150 as it traverses the undulating pattern/surface of the annular base member (or cam) 102. A second portion 255 of the roller (or wheel) 160 maintains contact with the annular outer portion 108 of the annular base member (or cam) 102. As the first annular member (or wheel ring) 104 is rotated about the second annular member (or center ring) 106, each of the rollers (or wheels) 160 follows the undulating pattern/surface of the annular outer portion 108 of the annular base member (or cam) 102, as shown in FIGS. 4-6.

Figure 4:
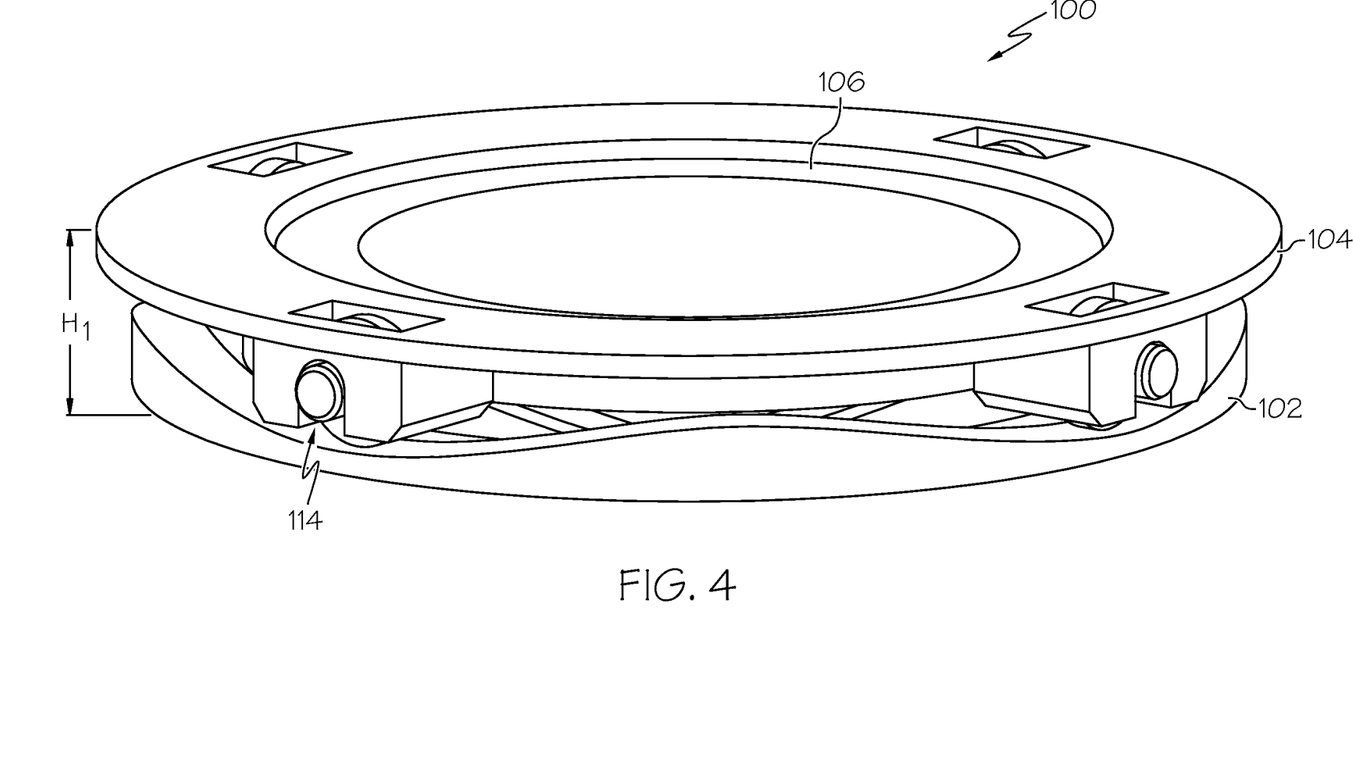
FIGS. 4-6 are top-front perspective views of the rotatable coupling mechanism of FIG. 1 illustrating movement of a first annular member (or wheel ring) along the z-axis according to one example.

For example, FIG. 4 shows the first annular member (or wheel ring) 104 in a first position comprising a height H1 with the rollers (or wheels) 160 resting in a valley region 114 of the annular outer portion 108 of the annular base member (or cam) 102. FIG. 5 shows that the first annular member (or wheel ring) 104 is being rotated in a clockwise direction and that the rollers (or wheels) 160 are transitioning towards a peak region 112. The portions (such as portions 457 and 459) of the annular base member (or cam) 102 between a peak region 112 and valley region 114 are sloped such that when the rollers (or wheels) 160 travel up these portions they experience an incline when transitioning from a valley region 114 to a peak region 112. Therefore, as the rollers (or wheels) 160 travel up a portion such as portion 457 the first annular member (or wheel ring) 104 experiences an upward axial force that raises the first annular member (or wheel ring) 104 in a vertical direction along the z-axis away from the annular base member (or cam) 102.

Figure 5:
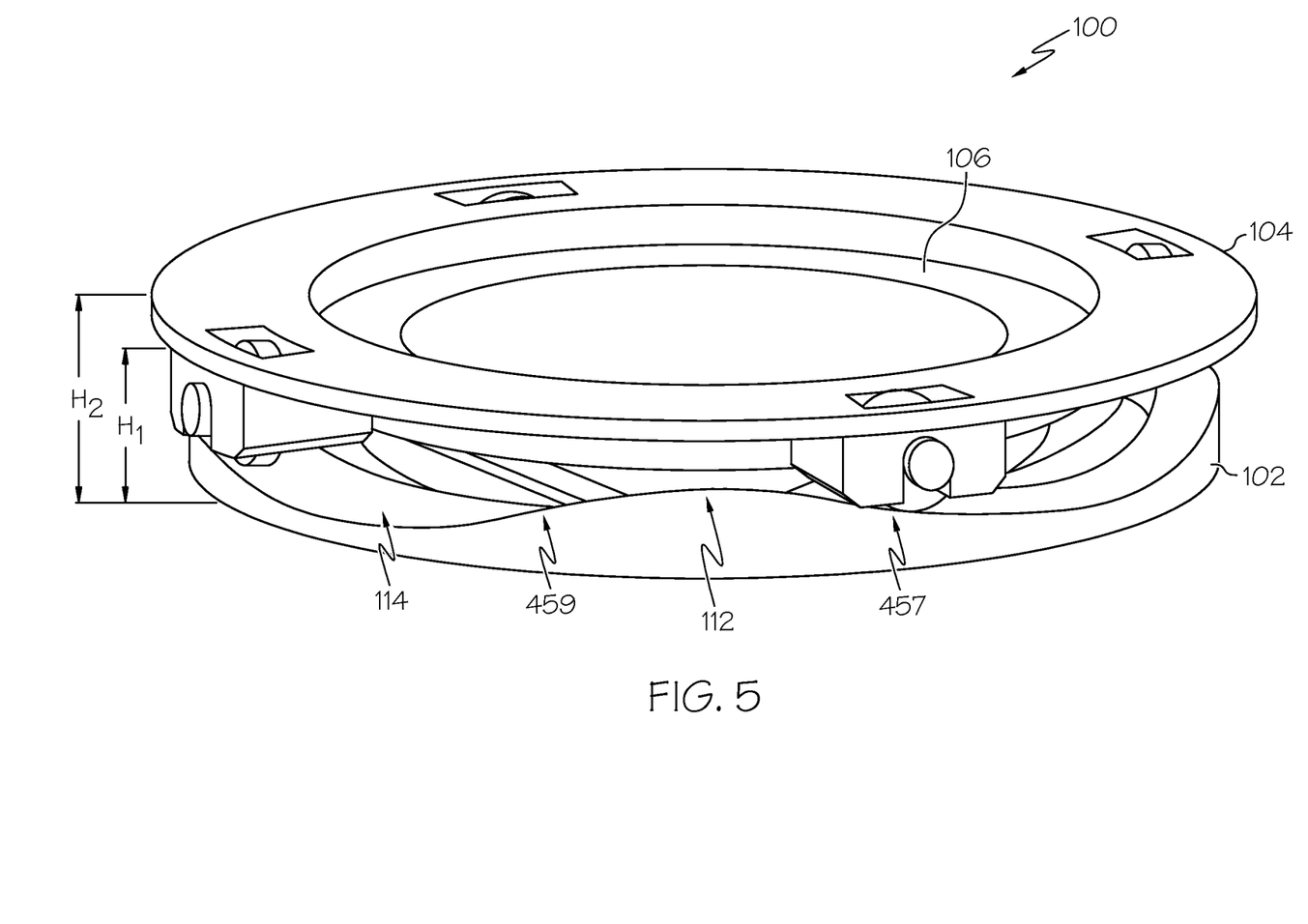
Figure 6:
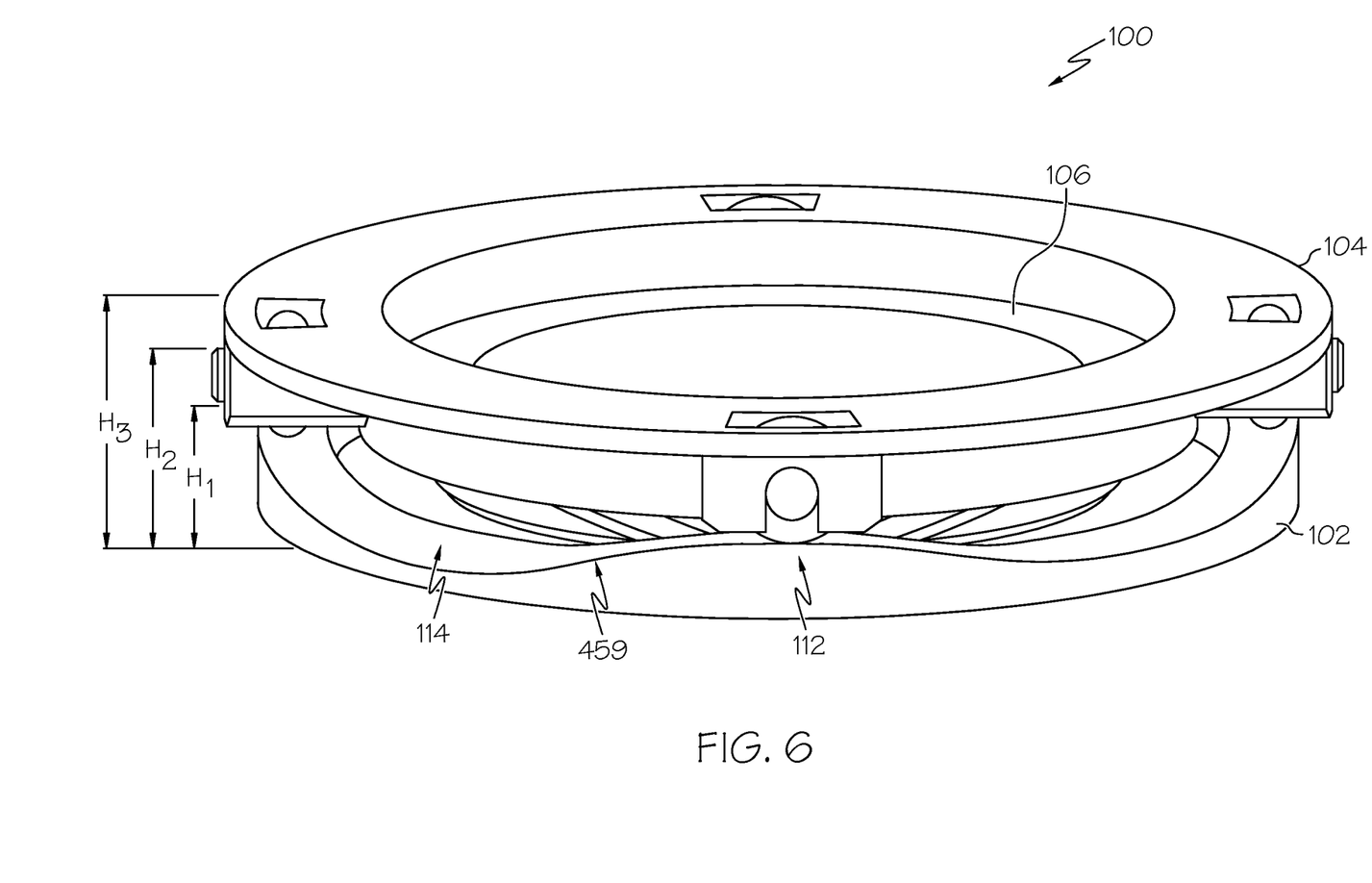

For example, as can be seen in FIG. 5, as the first annular member (or wheel ring) 104 transitions from a valley region 114 to a peak region 112 of the annular base member (or cam) 102 the distance from the annular base member (or cam) 102 increases from H1 to H2. FIG. 6 shows the first annular member (or wheel ring) 104 after it has been rotated such that the rollers 160 are at the top of a peak region 112. As can be seen, the distance of the first annular member (or wheel ring) 104 from the annular base member (or cam) 102 has now increased to H3. As the first annular member (or wheel ring) 104 continues to rotate each roller (or wheel) 160 transitions from a peak region 112 to a valley region 114. The transition from a peak region 112 to a valley region 114 lowers the first annular member (or wheel ring) 104 in the vertical direction since the portion 459 of the annular base member (or cam) has a decreasing slope.

Returning to FIG. 3, FIG. 3 further shows that the resilient member (or spring) 201 is disposed between the first portion 240 of the inner wall 238 of the first annular member (or wheel ring) 104 and the first outer wall portion 284 of the second annular member (or center ring) 106. The inner portion/wall 205 of the resilient member (or spring) 201 circumscribes the first outer wall portion 284 of the outer wall 282 of the second annular member (or center ring) 106. As discussed above, the resilient member (or spring) 201 comprises an undulating pattern/surface of peak regions 209, 211 and valleys 213, 215. In one example, the resilient member (or spring) 201 is disposed between the first annular member (or wheel ring) 104 and the second annular member (or center ring) 106 such that the first peak region 209 of the resilient member (or spring) 201 is aligned with the first peak region 112 of the annular outer portion 108 of the annular base member (or cam) 102 and a second peak region 211 of the resilient member (or spring) 201 is aligned with a second peak region 259 of the annular outer portion 108 of the annular base member (or cam) 102. In this example, the first and second peak regions 209, 211 of the resilient member (or spring) 201 are 180 degrees apart from each other and the first and second peak regions 212, 259 of the annular outer portion 108 of the annular base member (or cam) 102 are 180 degrees apart from each other. Continuing with this example, a first valley region 213 of the resilient member (or spring) 201 aligns with a third peak region 261 of the annular base member (or cam) 102 and a second valley region 215 of the resilient member (or spring) 201 aligns with a fourth peak region 263 of the annular base member (or cam) 102. In this example, the first and second valley regions 213, 215 of the resilient member (or spring) 201 are 180 degrees apart and the third and fourth peak regions 261, 263 of the annular base member (or cam) 102 are also 180 degrees apart.

The undulating pattern/surface of the resilient member (or spring) 201 allows it to maintain a tensioned state when disposed between the first and second annular member (or center ring) 104, 106. For example, the peak regions 209, 211 of the resilient member (or spring) 201 exert an upward axial force against the bottom surface 268 of the upper portion 164 of the second annular member (or center ring) 106. This upward axial force is exerted in a direction that is away from the annular base member (or cam) 102. The valley regions 213, 215 exert a downward axial force against the chamfered region 244 of the first annular member (or wheel ring) 104 that pushes the first annular member (or wheel ring) 104 towards the annular base member (or cam) 102. As the first annular member (or wheel ring) 104 transitions from a first position such as a resting position to a second position such as an extended positioned, the first annular member (or wheel ring) 104 moves in a vertical upward direction with respect to the annular base member (or cam) 102 and the second annular member (or center ring) 106. As the first annular member (or wheel ring) 104 moves in this vertical direction the valley regions 213, 215 of the resilient member (or spring) 201 exert an opposing force (e.g., a downward axial force towards the annular base member (or cam) 102 force) on the chamfered region 244 of the first annular member (or wheel ring) 104.

Figure 7:
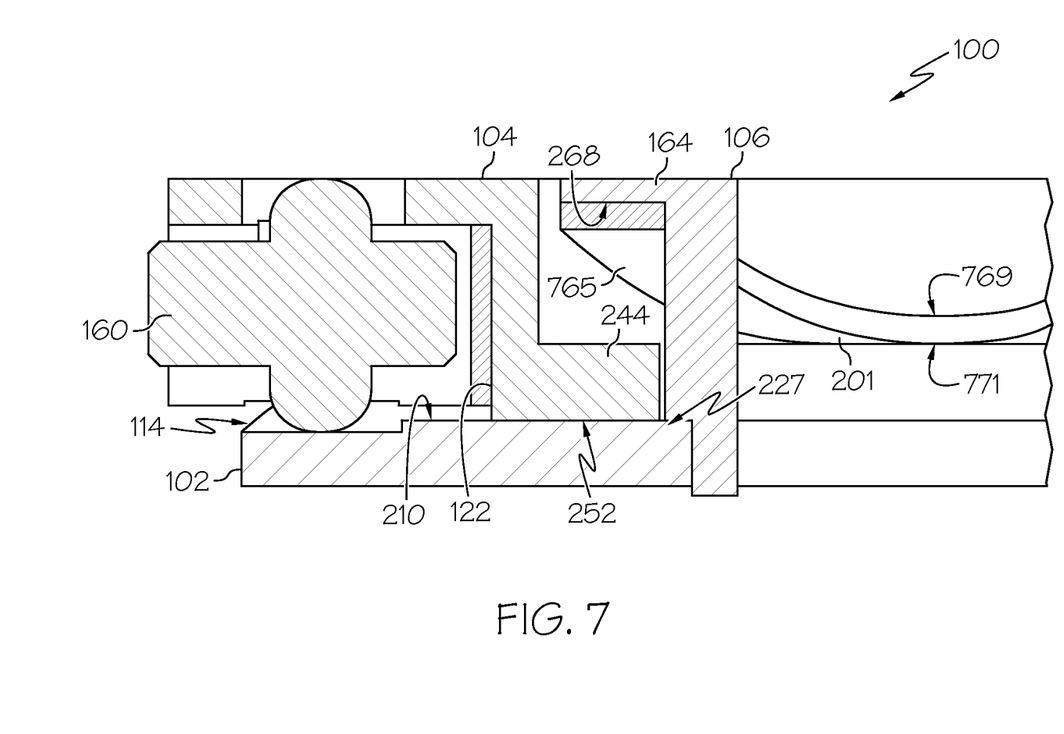
FIG. 7 is a cross-sectional view of the rotatable coupling mechanism of FIG. 1 showing the rotatable coupling mechanism in a resting position according to one example.

For example, FIG. 7 shows the first annular member (or wheel ring) 104 in a resting position (e.g., non-extended position) where roller (or wheel) 160 is within a valley region 114 of the annular base member (or cam) 102. When the first annular member (or wheel ring) 104 is in a resting position the bottom surface 252 of the lower portion 122 of the first annular member (or wheel ring) 104 is abutting the top surface 227 of the annular inner portion 210 of the annular base member (or cam) 102. As can be seen in FIG. 7, a portion 765 of the resilient member (or spring) 201 within a peak region 209 is exerting an upward axial force (in a direction away from the annular base member (or cam) 102) on the bottom surface 268 of the upper portion 164 of the second annular member (or center ring) 106. FIG. 7 also shows that a portion 769 of the resilient member (or spring) 201 in a valley region 213 is exerting an downward axial force on a portion 771 of the chamfered region 244 of the first annular member (or wheel ring) 104 that pushes the first annular member (or wheel ring) 104 towards the annular base member (or cam) 102. Because the valley regions 213, 215 of the resilient member (or spring) 201 are in constant contact with a portion of the chamfered region 244, the first annular member (or wheel ring) 104 experiences a constant downward axial force, which maintains the rollers (or wheels) 160 on the annular base member (or cam) 102.

Figure 8:
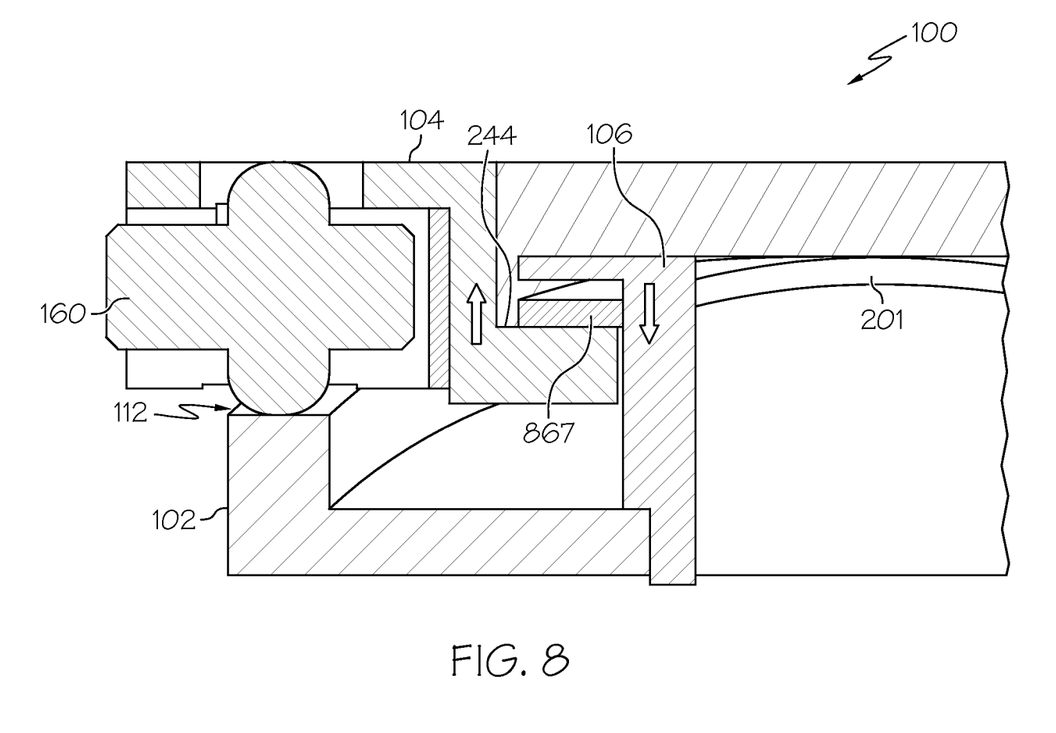
FIG. 8 is a cross-sectional view of the rotatable coupling mechanism of FIG. 1 showing the rotatable coupling mechanism in an extended position according to one example.

The first annular member (or wheel ring) 104 transitions from the resting position or non-extended position to an extended position as the rollers (or wheels) 160 travel from a valley region 114 of the annular base member (or cam) 102 to a peak region 112 of the annular base member (or cam) 102, as shown in FIG. 8. In particular, FIG. 8 shows that this transition from a valley region 114 to a peak region 112 results in the vertical distance between the first annular member (or wheel ring) 104 and second member 106 (and between the first annular member (or wheel ring) 104 and annular base member (or cam) 102) being increased. As the transitioning occurs, the portion 867 of the resilient member (or spring) 201 in a valley region 209 is forced in a vertical direction, towards the upper portion 164 of second annular member (or center ring) 106, by the chamfered region 244 of the first annular member (or wheel ring) 104 while at the same time applying an opposite force (e.g., a downward axial force) on the chamfered region 244. Therefore, as the first annular member (or wheel ring) 104 continues to transition from top of a peak region 112 of the annular base member (or cam) 102 to a valley region 114 of the annular base member (or cam) 102 this downward axial force exerted on the first annular member (or wheel ring) 104 continues the transition without user intervention where the rollers (or wheels) 160 are urged towards a valley region 114 of the annular base member (or cam) 102. Stated differently, the first annular member (or wheel ring) 104 continues to rotate without user intervention.

For example, FIGS. 9A-9F show one example of the rotatable coupling mechanism 100 and a portable electronic device 900 implementing the rotatable coupling mechanism 100. In the example of FIGS. 9A-9F, the rotatable coupling mechanism 100 is mechanically coupled to a first portion 973 and a second portion 975 of the portable electronic device 900. In particular, the first annular member (or wheel ring) 104 of the rotatable coupling mechanism 100 is mechanically coupled to the first portion 973, such as a display, of the portable electronic device 900. The annular base member (or cam) 102 of the rotatable coupling mechanism 100 is mechanically coupled to the second portion 975, such as a keyboard, of the portable electronic device 900.

Figure 9D:
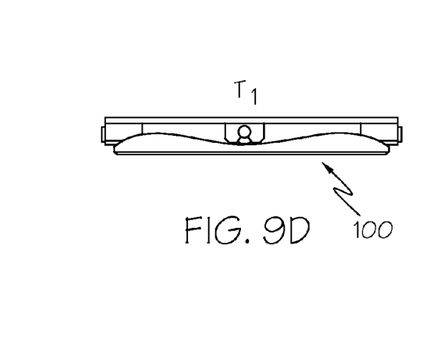

FIGS. 9A and 9D show that at T1 the rotatable coupling mechanism 100 is at a resting position and the second portion 975 of the device 900 is at a non-extended position or a first operating position with respect to the first portion 973. In other words, the first and second portions 973, 975 are parallel to each other, where the first portion 973 is substantially on top of the second portion 975. In the example of FIGS. 9A and 9D, the rotatable coupling mechanism 100 is at a resting position when the rollers (or wheels) 160 are within a valley region 114 of the annular base member (or cam) 102. As discussed above, when the rotatable coupling mechanism 100 is in the resting position, the first annular member (or wheel ring) 104 rests on top of the annular base member (or cam) 102 (i.e., is not extended/elevated). Also, because the resilient member (or spring) 201 is exerting a downward axial force toward the annular base member (or cam) 102 on the first annular member (or wheel ring) 104 and the rollers (or wheels) 160 are within a valley region 114, the rotatable coupling mechanism 100 requires a user to exert a rotational or longitudinal force to transition the rollers (or wheels) 160 up the inclined portion of the annular base member (or cam) 102 to the next peak region 112, as shown at T2 in FIGS. 9B and 9E.

Figure 9E:
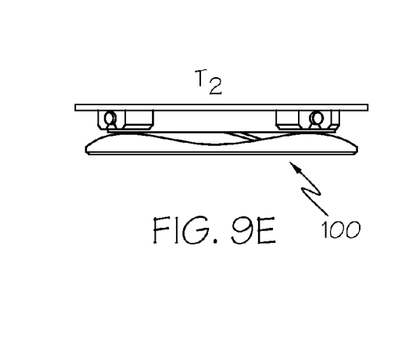
Figure 9F:
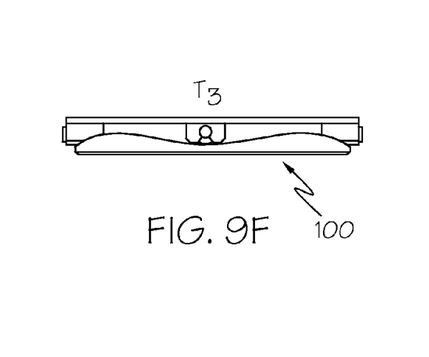

As can be seen at T2, the rotatable coupling mechanism 100 has transitioned from a valley region 114 to a peak region 112 of the annular base member (or cam) 102. This results in the first annular member (or wheel ring) 104 moving in a vertical direction away from the annular base member (or cam) 102 and the second annular member (or center ring) 106 and, thereby, increases the distance between the first portion 973 of the device 900 and the second portion 975 of the device. In other words, the first portion 973 of the device 900 is lifted off of the second portion 975 of the device 900. Also, FIGS. 9B and 9E show that at T2 the first portion 973 has rotated to a new position which is halfway between the first operating position of T1 and the second operating position of T3 in FIGS. 9C and 9F. Stated differently, because the annular base member (or cam) 102 transitions from a valley region 114 to a peak region 112 every 45 degrees in the example of FIGS. 9A-9F, the first portion 973 of the device 900 has been rotated 45 degrees at T2.

As discussed above, a peak region 112 on the annular base member (or cam) 102 transitions to a valley region 114 and, therefore, the portion 257 of the annular base member (or cam) 102 that transitions a peak region 112 to a valley region 114 comprises a decreasing slope. Therefore, once the first annular member (or wheel ring) 104 reaches a peak region 112, as shown at T2, the downward axial force of resilient member (or spring) 201 pulls the first annular member (or wheel ring) 104 down the slope to the valley region 114 without any user interaction, as shown at T3. As can be seen at T3, the first portion 973 has been transitioned to the second operating position with the first portion 973 being positioned perpendicular to the second portion 975.

As can be seen, the rotatable coupling mechanism 100 discussed above is advantageous over conventional mechanisms because it eliminates unnecessary wear by reducing friction. For example, the rollers (or wheels) eliminate the need for bearings, which create friction. Another advantage of the rotatable coupling mechanism 100 is that it can move along the z-axis. This reduces the friction experienced between the coupled components of the device by lifting the components off of each other as they are rotated. A further advantage of the rotatable coupling mechanism 100 is that it assists the user when rotating the coupled components.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A rotatable coupling mechanism comprising:
   an annular base member with an annular inner portion and an annular outer portion circumscribing the annular inner portion, the annular outer portion with a first undulating surface that comprises a set of alternating peak regions and valley regions;
   a first annular member that is movable in an axial direction with respect to the annular base member; and
   a second annular member that is mechanically coupled to the annular base member.

2. The rotatable coupling mechanism of claim 1, the first annular member comprising an inner beveled edge formed along an inner wall of the first annular member, the inner beveled edge coupling a first portion of the inner wall to a second portion of the inner wall, the first portion comprising a diameter that is larger than a diameter of the second portion.

3. The rotatable coupling mechanism of claim 1, the first annular member comprising a set of rollers disposed thereon and movable along the first undulating surface.

4. The rotatable coupling mechanism of claim 3, where each roller in the set of rollers is axially positioned perpendicular to an outer wall of the first annular member and rotatably retained by a set of retaining members.

5. The rotatable coupling mechanism of claim 4, where the set of retaining members are disposed on a bottom surface of a flanged region of the first annular member, the bottom surface facing the annular base member, where each retaining member in the set of retaining members defines a cavity for receiving a roller in the set of rollers, and where each retaining member defines a set of slots for receiving a set of extending members that extend in an outward direction from a center region of the roller.

6. The rotatable coupling mechanism of claim 1, where the first annular member transitions from a first position where a bottom surface of the first annular member substantially contacts the annular inner portion of the annular base member to a second position where the bottom surface of the first annular member is elevated from the annular inner portion of the annular base member as a set of rollers disposed on the first annular member moves from a valley region to a peak region in the set of alternating peak regions and valley regions of the first undulating surface.

7. The rotatable coupling mechanism of claim 1, where each peak region in the set of alternating peak regions and valley regions of the first undulating surface is disposed substantially 45 degrees from each other, and where each valley region in the set of alternating peak regions and valley regions of the first undulating surface is disposed substantially 45 degrees from each other.

8. The rotatable coupling mechanism of claim 1, where the first annular member transitions from a first position where a bottom surface of the first annular member is elevated from the annular inner portion of the annular base member to a second position where the bottom surface of the first annular member substantially contacts the annular inner portion of the annular base member as a set of rollers disposed on the first annular member moves from a peak region to a valley region in the set of alternating peak regions and valley regions of the first undulating surface.

9. The rotatable coupling mechanism of claim 8, where an axial force exerted by the resilient member transitions the first annular member from the first position to the second position without user intervention.

10. The rotatable coupling mechanism of claim 1, further comprising:
    a resilient member disposed between the first annular member and the second annular member.

11. The rotatable coupling mechanism of claim 10, the first annular member being disposed between the annular inner portion of the annular base member and a flanged region of the second annular member, the first annular member being rotatable around the annular base member and the second annular member, the resilient member being disposed between an inner wall of the first annular member and an outer wall of the second annular member.

12. The rotatable coupling mechanism of claim 11, where the second annular member comprises a first portion that extends from the flanged region towards the annular base member that is coupled to a second portion by a beveled edge, the first portion comprising a diameter that is larger than a diameter of the second portion.

13. The rotatable coupling mechanism of claim 10, the resilient member comprising a second undulating surface comprising a set of peak regions and a set of valley regions.

14. The rotatable coupling mechanism of claim 13, where the set of peak regions of the second undulating surface comprises a first peak region and a second peak region that are disposed substantially 180 degrees from each other, where the set of valley regions of the second undulating surface comprises a first valley region and a second valley region that are disposed substantially 180 degrees from each other and substantially 90 degrees from the first peak region and the second peak region, respectively.

15. A portable electronic device comprising:
- a first portion;
- a second portion; and
- a rotatable coupling mechanism coupled to the first portion and the second portion, the rotatable coupling mechanism comprising:
  - an annular base member with an annular inner portion and an annular outer portion circumscribing the annular inner portion, the annular outer portion with a first undulating surface that comprises a set of alternating peak regions and valley regions;
  - a first annular member that is movable in an axial direction with respect to the annular base member; and
  - a second annular member that is mechanically coupled to the annular base member.

16. The portable electronic device of claim 15, the first annular member comprising a set of rollers disposed thereon and movable along the first undulating surface.

17. The portable electronic device of claim 15, further comprising:
- a resilient member disposed between the first annular member and the second annular member.

18. The portable electronic device of claim 17, the first annular member being disposed between the annular inner portion of the annular base member and a flanged region of the second annular member, the first annular member being rotatable around the annular base member and the second annular member, the resilient member being disposed between an inner wall of the first annular member and an outer wall of the second annular member,
- the second annular member comprises a first portion that extends from the flanged region towards the annular base member that is coupled to a second portion by a beveled edged, the first portion comprising a diameter that is larger than a diameter of the second portion.

19. A rotatable coupling mechanism comprising:
- an annular base member comprising an undulating outer portion circumscribing an annular inner portion;
- a first annular member that is movable in an axial direction with respect to the annular base member, the first annular member comprising a flanged region; and
- a set of rollers disposed between a bottom surface of the flanged region of the first annular member and a top surface of the undulating outer portion of the annular base member.

20. The rotatable coupling mechanism of claim 19, further comprising:
- a second annular member that is mechanically coupled to the annular inner portion of the annular base member, where at least a portion of the second annular member is disposed within a cavity of the first annular member; and
- a resilient member disposed between a bottom surface of a flanged region of the second annular member and a top surface of an inner beveled edge of the first annular member, the inner beveled edge extending from an inner wall of the cavity of the first annular member.

* * * * *